United States Patent
Arai et al.

(10) Patent No.: US 10,829,714 B2
(45) Date of Patent: Nov. 10, 2020

(54) GREASE COMPOSITION FOR CONSTANT VELOCITY JOINTS, AND CONSTANT VELOCITY JOINT IN WHICH SAME IS SEALED

(71) Applicants: JXTG NIPPON OIL & ENERGY CORPORATION, Tokyo (JP); NTN CORPORATION, Osaka (JP)

(72) Inventors: Takashi Arai, Tokyo (JP); Yasuha Tokumo, Tokyo (JP); Minoru Ishijima, Shizuoka (JP); Takeyoshi Konomoto, Shizuoka (JP)

(73) Assignees: JXTG NIPPON OIL & ENERGY CORPORATION, Tokyo (JP); NTN CORPORATION, Osaka (JP)

( * ) Notice: Subject to any disclaimer, the term of this patent is extended or adjusted under 35 U.S.C. 154(b) by 0 days.

(21) Appl. No.: 16/310,941

(22) PCT Filed: Jun. 22, 2017

(86) PCT No.: PCT/JP2017/023061
§ 371 (c)(1),
(2) Date: Dec. 18, 2018

(87) PCT Pub. No.: WO2017/222018
PCT Pub. Date: Dec. 28, 2017

(65) Prior Publication Data
US 2019/0177644 A1    Jun. 13, 2019

(30) Foreign Application Priority Data

Jun. 23, 2016 (JP) .................................. 2016-124457

(51) Int. Cl.
*C10M 169/00* (2006.01)
*C10M 135/18* (2006.01)
(Continued)

(52) U.S. Cl.
CPC ........ *C10M 169/00* (2013.01); *C10M 115/08* (2013.01); *C10M 119/24* (2013.01);
(Continued)

(58) Field of Classification Search
CPC ........ C10M 2203/003; C10M 2201/00; C10M 2201/043; C10M 2217/0456;
(Continued)

(56) References Cited

U.S. PATENT DOCUMENTS

| | | | |
|---|---|---|---|
| 5,512,188 A | 4/1996 | Kinoshita et al. |
| 5,726,131 A | 3/1998 | Froesch-Mann |

(Continued)

FOREIGN PATENT DOCUMENTS

| | | |
|---|---|---|
| JP | 1-503545 | 11/1989 |
| JP | 1-503789 | 12/1989 |

(Continued)

OTHER PUBLICATIONS

European Search Report issued in EP Patent Application No. 17815484.5, dated Jan. 23, 2020.
(Continued)

*Primary Examiner* — Vishal V Vasisth
(74) *Attorney, Agent, or Firm* — Greenblum & Bernstein, P.L.C.

(57) ABSTRACT

The present invention provides a grease composition for constant velocity joints, which includes a lubricating base oil, a thickener including a nitrogen-containing compound, a triglyceride, a diester, and a boron nitride, wherein a total content of the triglyceride and the diester is 1 to 5 mass % based on a total amount of the grease composition, and a mass ratio of a content of the triglyceride to a content of the diester (triglyceride/diester) is 0.3 to 1.5.

5 Claims, 3 Drawing Sheets

(51) Int. Cl.

| | |
|---|---|
| *C10M 137/10* | (2006.01) |
| *C10M 125/26* | (2006.01) |
| *C10M 129/72* | (2006.01) |
| *C10M 129/74* | (2006.01) |
| *C10M 135/20* | (2006.01) |
| *C10M 141/06* | (2006.01) |
| *C10M 115/08* | (2006.01) |
| *F16D 3/20* | (2006.01) |
| *C10M 119/24* | (2006.01) |
| *C10M 125/06* | (2006.01) |
| *C10M 141/10* | (2006.01) |
| *C10N 40/04* | (2006.01) |
| *C10N 50/10* | (2006.01) |
| *F16D 3/223* | (2011.01) |

(52) U.S. Cl.
CPC ........ *C10M 125/06* (2013.01); *C10M 125/26* (2013.01); *C10M 129/72* (2013.01); *C10M 129/74* (2013.01); *C10M 135/18* (2013.01); *C10M 135/20* (2013.01); *C10M 137/10* (2013.01); *C10M 141/06* (2013.01); *C10M 141/10* (2013.01); *F16D 3/20* (2013.01); C10M 2201/00 (2013.01); C10M 2201/043 (2013.01); C10M 2203/003 (2013.01); C10M 2207/282 (2013.01); C10M 2207/283 (2013.01); C10M 2217/0456 (2013.01); C10M 2219/068 (2013.01); C10M 2223/045 (2013.01); C10N 2040/04 (2013.01); C10N 2050/10 (2013.01); *F16D 3/223* (2013.01); F16D 2300/06 (2013.01)

(58) Field of Classification Search
CPC ...... C10M 2207/283; C10M 2207/282; C10M 2219/068; C10M 2223/045; C10N 2240/04; C10N 2250/10; C10N 2050/10; C10N 2010/12; C10N 2010/04; C10N 2010/06

See application file for complete search history.

(56) References Cited

U.S. PATENT DOCUMENTS

| | | |
|---|---|---|
| 5,872,085 A | 2/1999 | Froesch-Mann |
| 2009/0305920 A1 | 12/2009 | Kato et al. |
| 2015/0218483 A1 | 8/2015 | Takabe et al. |
| 2015/0315509 A1* | 11/2015 | Watanabe ............ C10M 129/26 508/525 |

FOREIGN PATENT DOCUMENTS

| | | |
|---|---|---|
| JP | 10-147791 | 6/1998 |
| JP | 11-12589 | 1/1999 |
| JP | 2007-056139 | 3/2007 |
| JP | 2008-69282 | 3/2008 |
| JP | 2008-156624 | 7/2008 |
| JP | 2014-043526 | 3/2014 |
| WO | 2014/034647 | 3/2014 |

OTHER PUBLICATIONS

English-language translation of International Search Report for International Patent Application No. PCT/JP2017/023061, dated Jul. 18, 2017.
English-language translation of International Preliminary Report on Patentability for International Patent Application No. PCT/JP2017/023061, dated Dec. 25, 2018.

* cited by examiner

US 10,829,714 B2

GREASE COMPOSITION FOR CONSTANT VELOCITY JOINTS, AND CONSTANT VELOCITY JOINT IN WHICH SAME IS SEALED

This application is a 371 of PCT/JP2017/023061, filed Jun. 22, 2017.

TECHNICAL FIELD

The present invention relates to a grease composition for constant velocity joints, and a constant velocity joint in which the same is sealed, and particularly relates to a grease composition suitable for a constant velocity joint applied to drive shafts for automobiles, and a constant velocity joint in which the same is sealed.

BACKGROUND ART

The constant velocity joint is a universal joint which transmits torque by rotation at a constant angular velocity at an optional crossed axes angle between crossing two axes, and has been widely used for e.g. cars and industrial machinery. In car application, the constant velocity joint is used for a drive shaft to transmit power from a car differential gear to a driving wheel and for a propeller shaft to transmit power to a differential gear in front engine rear drive cars and four wheel drive cars.

A grease is sealed in a constant velocity joint as a lubricant. As the grease for constant velocity joints, those which are obtained by combining a base grease including a lubricating base oil, a lithium soap and a urea thickener with additives such as molybdenum disulfide have been used (for example see Patent Literature 1).

A constant velocity joint is also equipped with a boot to prevent leakage of a grease sealed in the inside thereof to the outside. This boot is made up of a rubber material such as chloroprene rubber, silicone rubber or chlorinated polyethylene rubber, or a resin material such as a thermoplastic elastomer, and it is desired that the effect of a grease on a boot material, that is, changes in physical properties of the boot material with the boot material and the grease brought into contact with each other be small.

Furthermore, the present inventors have proposed a grease composition, which, even when the amount of additives such as molybdenum disulfide and organomolybdenum that are relatively expensive, are reduced to cut the cost of grease, can provide a longer life and a lower vibration degree for a constant velocity joint and simultaneously keep an effect on a boot material low by combining e.g. a triglyceride (for example see Patent Literature 2).

CITATION LIST

Patent Literature

Patent Literature 1: Japanese Unexamined Patent Publication No. 2007-056139
Patent Literature 2: Japanese Unexamined Patent Publication No. 2014-043526

SUMMARY OF INVENTION

Technical Problem

Incidentally, a constant velocity joint makes a complicated rolling and sliding motion for example on special car driving conditions, and stress is repeatedly applied to a lubricating portion in which metallic contact occurs. Therefore, a grease composition has been required to improve durability under severe lubrication conditions.

Because of this, a subject of the present invention is to provide a grease composition for constant velocity joints, which can improve durability under severe lubrication conditions, and a constant velocity joint in which the same is sealed.

Solution to Problem

In order to solve the above subject, the present invention provides grease compositions described in [1] to [5] below, and a constant velocity joint described in [6] below.
[1] A grease composition for constant velocity joints comprising a lubricating base oil, a thickener comprising a nitrogen-containing compound, a triglyceride, a diester, and a boron nitride, wherein a total content of the triglyceride and the diester is 1 to 5 mass % based on a total amount of the grease composition, and a mass ratio of a content of the triglyceride to a content of the diester (triglyceride/diester) is 0.3 to 1.5.
[2] The grease composition for constant velocity joints according to [1], further comprising an organomolybdenum, a zinc dithiophosphate and a polysulfide.
[3] The grease composition for constant velocity joints according to [2], wherein, a content of the organomolybdenum is 0.05 to 0.5 mass % in terms of molybdenum element, and a total content of the organomolybdenum, the zinc dithiophosphate and the polysulfide is 2 to 5 mass %, based on the total amount of the grease composition.
[4] The grease composition for constant velocity joints according to any of [1] to [3], wherein a content of the boron nitride is 0.05 to 1 mass % based on the total amount of the grease composition.
[5] The grease composition for constant velocity joints according to any of [1] to [4], wherein the composition is used for lubricating constant velocity joints applied to drive shafts for automobiles.
[6] A constant velocity joint comprising the grease composition for constant velocity joints according to any of [1] to [4], the grease composition sealed in the constant velocity joint.

Advantageous Effects of Invention

According to the grease composition of the present invention, it is possible to improve durability under severe lubrication conditions.

DESCRIPTION OF EMBODIMENTS

Figure 1:
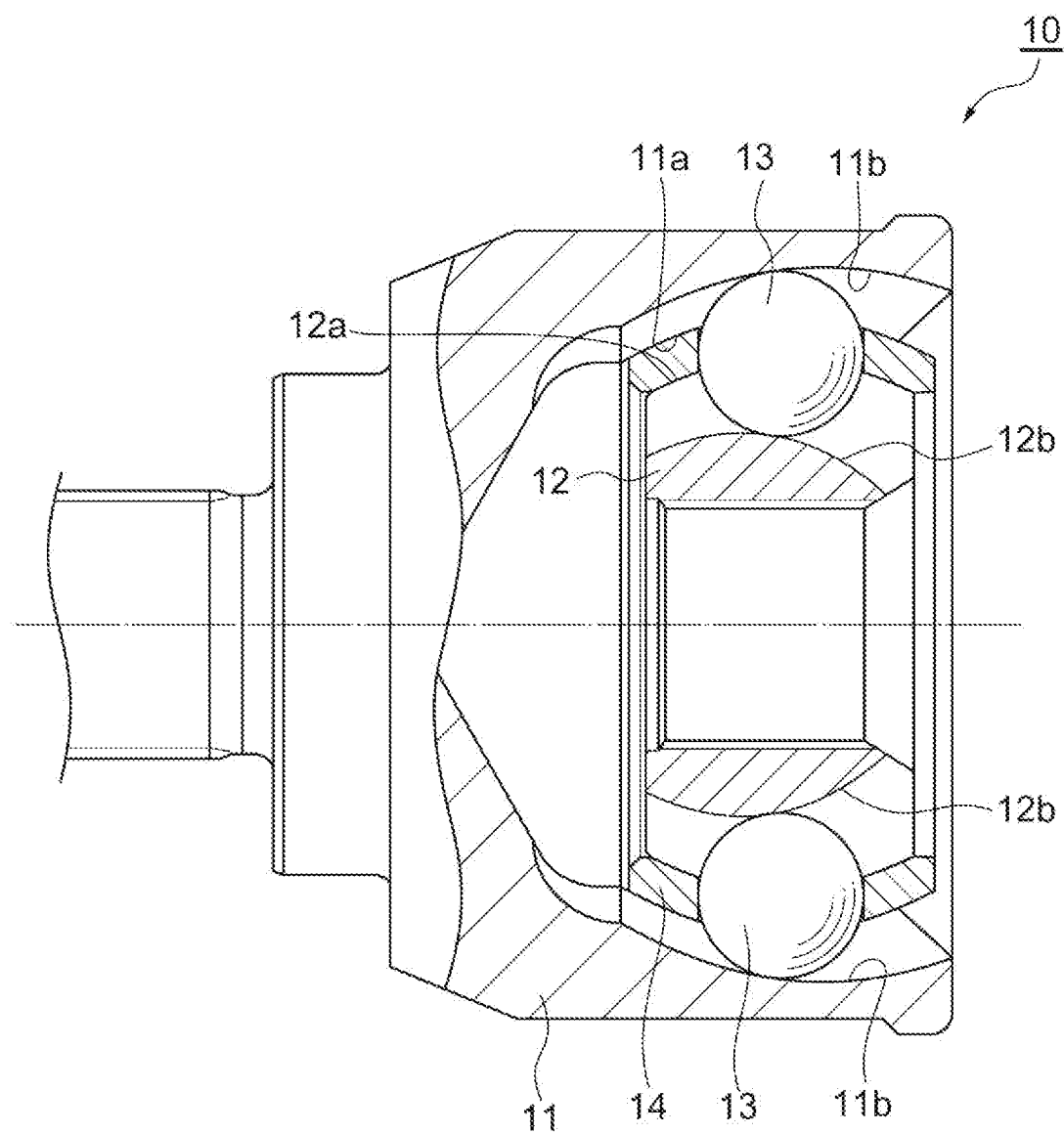
FIG. 1 is a schematic cross-sectional view which shows an example of a fixed constant velocity joint.

First Embodiment: Grease Composition for Constant Velocity Joints

The grease composition for constant velocity joints according to the first embodiment of the present invention includes a (a) lubricating base oil, a (b) thickener including a nitrogen-containing compound, a (c) triglyceride, a (d) diester, and a (h) boron nitride. In this grease composition, the total content of triglyceride and diester is 1 to 5 mass % based on the total amount of the grease composition, and the mass ratio of the content of the triglyceride to the content of the diester (triglyceride/diester) is 0.3 to 1.5.

It is preferred that the grease composition further includes an (e) organomolybdenum, a (f) zinc dithiophosphate, and a (g) polysulfide. In this case, it is preferred that the content of the organomolybdenum is 0.05 to 0.5 mass % in terms of molybdenum element, and the total content of the organomolybdenum, the zinc dithiophosphate and the polysulfide is 2 to 5 mass %. It is preferred that the content of the boron nitride is 0.1 to 1 mass %. It is preferred that the grease composition is used for lubrication of fixed constant velocity joints applied to drive shafts for automobiles.

As the (a) lubricating base oil, a mineral oil and/or a synthetic oil can be used.

As the mineral oil, a mineral oil obtained by a method commonly used in the process of producing a lubricating oil in the petroleum refining industry can be used. Examples thereof can include e.g. paraffinic or naphthenic mineral oil obtained by refining a lubricating oil fraction obtained by atmospheric distillation and vacuum distillation of crude oil using one of refining treatments such as solvent deasphalting, solvent extraction, hydrocracking, solvent dewaxing, catalytic dewaxing, hydrotreating, sulfuric acid cleaning, and clay treatment, or properly combining two or more refining treatments.

Examples of the synthetic oil include polyolefin oil, alkylbenzene oil, alkylnaphthalene oil, biphenyl oil, diphenylalkane oil, di(alkylphenyl) alkane oil, ester oil, polyglycol oil, polyphenyl ether oil, fluorine compounds such as perfluoropolyether and fluorinated polyolefin, and silicone oil, and the like.

The lubricating base oil is preferably hydrocarbon compounds typified by mineral oil and polyolefin oil, particularly a base oil including a paraffinic hydrocarbon compound or a base oil obtained by mixing a paraffinic hydrocarbon compound and a naphthenic hydrocarbon compound.

The kinematic viscosity at 100° C. of the lubricating base oil is preferably 1 to 200 mm²/s, and more preferably 5 to 50 mm²/s. The content of the lubricating base oil is preferably 60 mass % or more and more preferably 70 mass % or more based on the total amount of the grease composition. When the kinematic viscosity and the content of the lubricating base oil are within the ranges, a grease composition with a desired consistency is simply and easily prepared.

As the (b) thickener including a nitrogen-containing compound, at least one selected from a urea thickener, a urethane thickener and a urea-urethane thickener can be used. Using these thickeners, sufficient heat resistance can be obtained.

Examples of the urea thickener include urea compounds such as diurea compounds, triurea compounds, tetraurea compounds and polyurea compounds (excluding diurea compounds, triurea compounds and tetraurea compounds), urethane compounds such as urea-urethane compounds and diurethane or mixtures thereof, and the like. Among these, diurea compounds, urea-urethane compounds, diurethane compounds or mixtures thereof are preferred.

Preferred examples of the urea thickener include a diurea compound represented by the general formula (1):

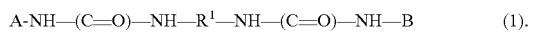   (1).

In the general formula (1), $R^1$ represents a divalent organic group, and preferably represents a divalent hydrocarbon group. Specific examples of such divalent hydrocarbon group include a linear or branched alkylene group, a linear or branched alkenylene group, a cycloalkylene group, an arylene group, an alkylarylene group, an arylalkylene group and the like. In addition, A and B represent a monovalent organic group, and preferably represent a monovalent hydrocarbon group. Specific examples of such monovalent hydrocarbon group include a linear or branched alkyl group, a linear or branched alkenyl group, a cycloalkyl group, an aryl group, an alkylaryl group, an arylalkyl group and the like.

Preferred examples of the urea-urethane thickener include a urea-urethane compound represented by the general formula (2):

   (2).

In the general formula (2), $R^1$ represents a divalent organic group, and preferably represents a divalent hydrocarbon group. Specific examples of such divalent hydrocarbon group include a linear or branched alkylene group, a linear or branched alkenylene group, a cycloalkylene group, an arylene group, an alkylarylene group, an arylalkylene group and the like. In addition, A and B represent a monovalent organic group, and preferably represent a monovalent hydrocarbon group. Specific examples of such monovalent hydrocarbon group include a linear or branched alkyl group, a linear or branched alkenyl group, a cycloalkyl group, an aryl group, an alkylaryl group, an arylalkyl group and the like.

The content of the (b) thickener is preferably 2 to 20 mass % and more preferably 5 to 15 mass % based on the total amount of the grease composition.

The (c) triglyceride is for example a triester of glycerin and monocarboxylic acids. The monocarboxylic acid is a fatty acid having preferably 8 to 24 carbon atoms and more preferably 10 to 20 carbon atoms. As such triglyceride, those which are commercially available as oils and fats can be used, and for example beef fat, pork fat, sunflower oil, soybean oil, rapeseed oil, rice bran oil, coconut oil, palm oil, and palm kernel oil can be used.

The content of the (c) triglyceride is preferably 0.5 to 5 mass %, more preferably 0.5 to 3 mass %, and further preferably 0.5 to 1.5 mass % based on the total amount of the grease composition.

The (d) diester is for example an ester of a dicarboxylic acid and a monohydric alcohol. Examples of the dicarboxylic acid include a compound in which two hydrogen atoms of an aliphatic hydrocarbon are substituted with carboxyl groups, and preferably a compound in which hydrogen atoms at both ends of an aliphatic hydrocarbon are substituted with carboxyl groups. The number of carbon atoms in the dicarboxylic acid is preferably 2 to 18, and more preferably 4 to 10. The monohydric alcohol is preferably an aliphatic alcohol, and more preferably a branched saturated aliphatic alcohol. The number of carbon atoms in the monohydric alcohol is preferably 2 to 18, and more preferably 4 to 10. The number of carbon atoms in the diester is preferably 15 to 30, and more preferably 20 to 25.

The content of the (d) diester is preferably 0.2 to 10 mass %, more preferably 0.5 to 5 mass %, and further preferably 0.5 to 3 mass % based on the total amount of the grease composition.

The mass ratio of the content of the (c) triglyceride to the content of the (d) diester ((c) triglyceride/(d) diester) is 0.3 to 1.5, preferably 0.3 to 1.2, more preferably 0.3 to 0.9, and further preferably 0.3 to 0.6. The total content of the (c)

triglyceride and the (d) diester is 1 to 5 mass %, preferably 2 to 5 mass %, more preferably 2 to 4 mass %, and further preferably 2 to 3 mass %.

As the (e) organomolybdenum, molybdenum dithiocarbamate and/or molybdenum dithiophosphate can be used.

As the molybdenum dithiocarbamate, those commercially available as lubricating oil additives can be used, and for example a compound represented by the following general formula (3) can be used:

[Chem. 1]

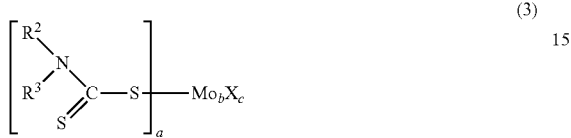

(3)

In the general formula (3), $R^2$ and $R^3$ may be the same or different and each represent a hydrocarbon group having one or more carbon atoms, X may be the same or different and each represent an oxygen atom or sulfur atom, and a, b and c each represent an integer from 1 to 6. Examples of the hydrocarbon group represented by $R^2$ and $R^3$ in the general formula (3) include a C1-24 alkyl group, a C5-7 cycloalkyl group, a C6-11 alkylcycloalkyl group, a C6-18 aryl group, a C7-24 alkylaryl group and a C7-12 arylalkyl group.

The content of the molybdenum element in molybdenum dithiocarbamate is preferably 10 to 40 mass %, and more preferably 10 to 30 mass % based on the total amount of molybdenum dithiocarbamate. The content of the sulfur element in molybdenum dithiocarbamate is preferably 10 to 40 mass %, and more preferably 20 to 35 mass % based on the total amount of molybdenum dithiocarbamate.

As molybdenum dithiophosphate, those commercially available as lubricating oil additives can be used. Preferred examples of molybdenum dithiophosphate can include a compound represented by the following general formula (4):

[Chem. 2]

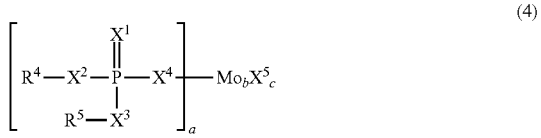

(4)

In the general formula (4), $R^4$ and $R^5$ may be the same or different and each represent a hydrocarbon group having one or more carbon atoms, $X^1$, $X^2$, $X^3$, $X^4$ and $X^5$ may be the same or different and each represent an oxygen atom or a sulfur atom, and a, b and c each represent an integer from 1 to 6. Examples of the hydrocarbon group represented by $R^4$ and $R^5$ in the formula (4) include a C1-24 alkyl group, a C5-7 cycloalkyl group, a C6-11 alkylcycloalkyl group, a C6-18 aryl group, a C7-24 alkylaryl group and a C7-12 arylalkyl group.

The content of the molybdenum element in molybdenum dithiophosphate is preferably 2 to 20 mass %, and more preferably 5 to 15 mass % based on the total amount of molybdenum dithiophosphate. The content of the phosphorus element in molybdenum dithiophosphate is preferably 1 to 20 mass %, and more preferably 3 to 10 mass % based on the total amount of molybdenum dithiophosphate. The content of the sulfur element in molybdenum dithiophosphate is preferably 5 to 25 mass %, and more preferably 10 to 20 mass % based on the total amount of molybdenum dithiophosphate.

The content of the (e) organomolybdenum is preferably 0.05 to 0.5 mass %, and more preferably 0.05 to 0.4 mass % in terms of molybdenum element based on the total amount of the grease composition.

As the (f) zinc dithiophosphate, those commercially available as lubricating oil additives can be used, and for example a compound represented by the following general formula (5) can be used.

[Chem. 3]

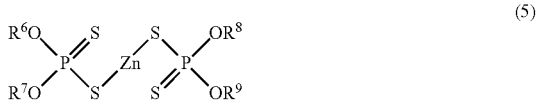

(5)

In the general formula (5), $R^6$ to $R^9$ may be the same or different and each represent a hydrocarbon group. Examples of the hydrocarbon group represented by $R^6$ to $R^9$ in the general formula (5) include a C1-24 alkyl group, a C5-7 cycloalkyl group, a C6-11 alkylcycloalkyl group, a C6-18 aryl group, a C7-24 alkaryl group or a C7-12 aralkyl group, and preferably a C2-10 alkyl group, particularly a secondary branched alkyl group.

The content of the zinc element in zinc dithiophosphate is preferably 2 to 20 mass %, and more preferably 5 to 15 mass % based on the total amount of zinc dithiophosphate. The content of the phosphorus element in zinc dithiophosphate is preferably 2 to 25 mass %, and more preferably 4 to 15 mass % based on the total amount of zinc dithiophosphate. The content of the sulfur element in zinc dithiophosphate is preferably 10 to 30 mass %, and more preferably 15 to 25 mass % based on the total amount of zinc dithiophosphate.

The content of the (f) zinc dithiophosphate is preferably 0.2 to 2 mass %, and more preferably 0.3 to 1 mass % based on the total amount of the grease composition.

As the (g) polysulfide, those commercially available as lubricating oil additives can be used, and for example a compound represented by the following general formula (6) can be used:

$$R^{10}\text{—}S_x\text{—}R^{11} \qquad (6).$$

In the general formula (6), $R^{10}$ and $R^{11}$ may be the same or different and each represent a C3-20 linear or branched alkyl group, a C6-20 aryl group, a C6-20 alkaryl group or a C6-20 aralkyl group, and x represents an integer from 2 to 6, and preferably an integer from 2 to 5.

The content of the sulfur element in polysulfide is preferably 20 to 55 mass %, and more preferably 35 to 50 mass % based on the total amount of polysulfide. The content of the polysulfide is preferably 0.1 to 2 mass %, and more preferably 0.2 to 1.8 mass % based on the total amount of the grease composition.

The total content of the (e) organomolybdenum, the (f) zinc dithiophosphate and the (g) polysulfide is preferably 2 to 5 mass %, and more preferably 2 to 4 mass % based on the total amount of the grease composition.

The (h) boron nitride is not particularly limited as long as it is commonly used as a solid lubricant.

The particle diameter of boron nitride is preferably 0.2 to 50 μm, and more preferably 1 to 10 μm. The content of the (h) boron nitride is preferably 0.05 to 1 mass %, and more preferably 0.05 to 0.5 mass % based on the total amount of the grease composition.

In addition to the above (a) to (h) components, the grease composition according to the first embodiment can further include additives which are commonly used for lubricating oil and grease as needed. Examples of such additives include a detergent, a dispersant, an anti-wear agent, a viscosity index improver, an anti-oxidant, an extreme pressure agent, an anti-rust agent, a corrosion inhibitor and the like.

The grease composition according to the above first embodiment is sealed in a constant velocity joint and used. As the constant velocity joint, fixed constant velocity joint and sliding constant velocity joint structures can be used. Examples thereof include a fixed constant velocity joint having balls as a rolling element, and a sliding constant velocity joint having balls or rollers as a rolling element. Such constant velocity joints can be applied to a drive shaft for automobiles.

Second Embodiment: Fixed Constant Velocity Joint

The constant velocity joint according to the second embodiment of the present invention is a constant velocity joint in which the grease composition for constant velocity joints according to the above first embodiment is sealed. As the constant velocity joint, fixed constant velocity joint and sliding constant velocity joint structures can be used. Examples thereof include a fixed constant velocity joint having balls as a rolling element, and a sliding constant velocity joint having balls or rollers as a rolling element.

Figure 2:
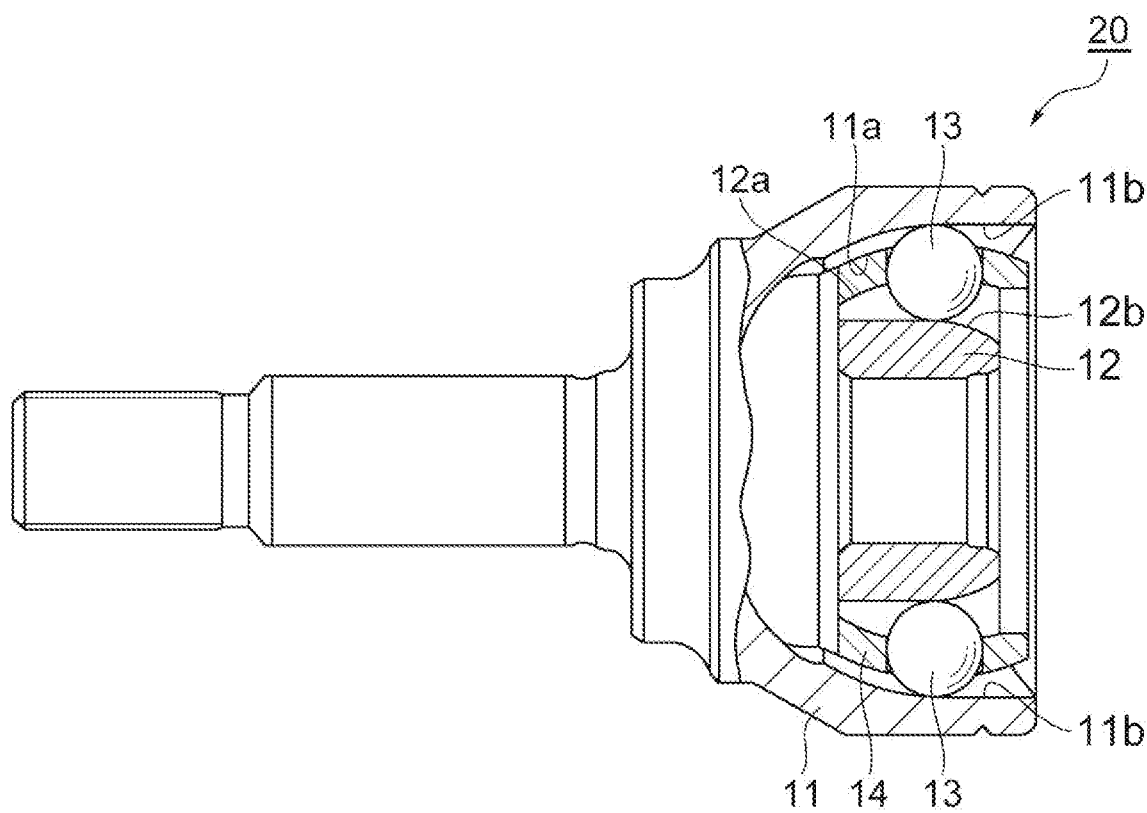
FIG. 2 is a schematic cross-sectional view which shows another example of a fixed constant velocity joint.

An example of the fixed constant velocity joint having balls as a rolling element is one called a birfield-type fixed constant velocity joint 10 shown in FIG. 1. As shown in FIG. 1, the birfield-type fixed constant velocity joint 10 is equipped with an external joint member 11 in which a plurality of grooves 11b are formed on a spherical inner peripheral surface 11a, an internal joint member 12 in which a plurality of grooves 12b making a pair with the grooves 11b of the external joint member 11 are formed on a spherical outer peripheral surface 12a, and balls 13 as rolling elements existing between the grooves 11b of the external joint member 11 and the grooves 12b of the internal joint member 12, and has a structure in which a cage 14 to hold balls 13 exists between the external joint member 11 and the internal joint member 12. The number of balls 13 is preferably 3 to 10. As the birfield-type fixed constant velocity joint, an undercut free-type fixed constant velocity joint 20 shown in FIG. 2 is also included. In addition, the constant velocity joint is equipped with a boot to prevent leakage of a grease sealed in the inside thereof to the outside, and prevent intrusion of foreign matter into the inside thereof (not shown).

Figure 3:
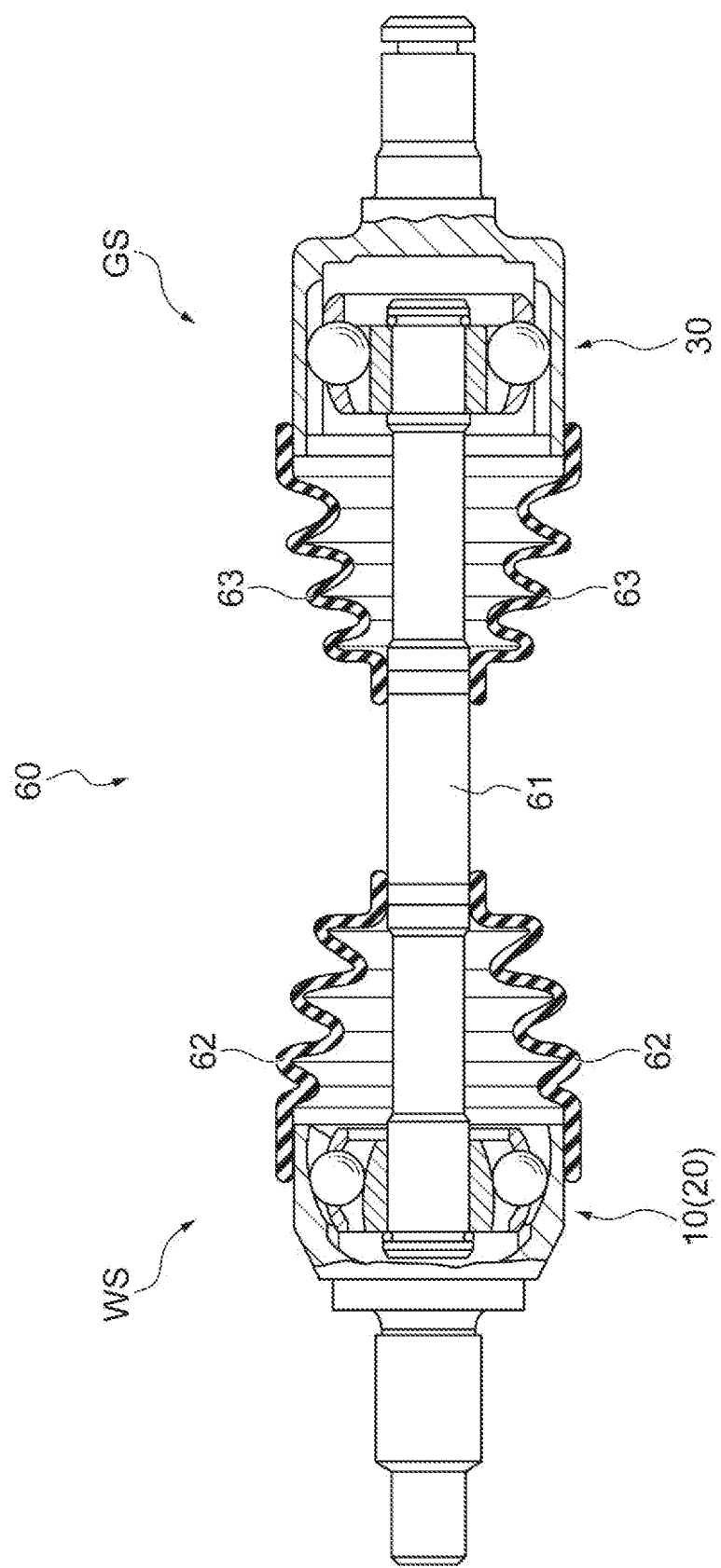
FIG. 3 is a schematic cross-sectional view which shows an example of a drive shaft for an automobile.

The above constant velocity joints 10 and 20 can be applied to a drive shaft for an automobile. FIG. 3 is a schematic cross-sectional view which shows an example of the drive shaft for an automobile. The drive shaft for an automobile 60 is equipped with a fixed constant velocity joint 10(20) on the driving wheel side WS and a sliding constant velocity joint 30 on the differential gear side GS, and has a structure in which these constant velocity joints 10(20) and 30 are connected through a shaft 61. The constant velocity joints 10(20) and 30 are equipped with boots 62 and 63 put between the external joint members 11 and the shaft 61 to prevent leakage of a grease sealed in the inside thereof to the outside and prevent intrusion of foreign matter into the inside thereof.

EXAMPLES

The present invention will now be described in more detail by way of Examples and Comparative Example. It should be noted, however, that the present invention is not limited to Examples below.

Examples 1 to 6, Comparative Example 1

The constitution of grease compositions in Examples and Comparative Example is shown in Table 1. The components in Table 1 are described below.
(a) Lubricating base oil:

Examples 1 to 6

Lubricating base oil (kinematic viscosity at 100° C.: 13.1 mm$^2$/s, kinematic viscosity at 40° C.: 129.9 mm$^2$/s) obtained by mixing paraffinic mineral oil 1 (kinematic viscosity at 100° C.: 10.7 mm$^2$/s, kinematic viscosity at 40° C.: 93.9 mm$^2$/s, density at 15° C.: 0.8858 g/cm$^3$), paraffinic mineral oil 2 (kinematic viscosity at 100° C.: 31.7 mm$^2$/s, kinematic viscosity at 40° C.: 500 mm$^2$/s, density at 15° C.: 0.9008 g/cm$^3$), and naphthenic mineral oil (kinematic viscosity at 100° C.: 2.2 mm$^2$/s, kinematic viscosity at 40° C.: 8.0 mm$^2$/s, density at 15° C.: 0.9115 g/cm$^3$) at a mass ratio of 45:45:10.

Comparative Example 1

Lubricating base oil (kinematic viscosity at 100° C.: 15.7 mm$^2$/s, kinematic viscosity at 40° C.: 179.2 mm$^2$/s) obtained by mixing paraffinic mineral oil 1 (kinematic viscosity at 100° C.: 10.7 mm$^2$/s, kinematic viscosity at 40° C.: 93.9 mm$^2$/s, density at 15° C.: 0.8858 g/cm$^3$), paraffinic mineral oil 2 (kinematic viscosity at 100° C.: 31.7 mm$^2$/s, kinematic viscosity at 40° C.: 500 mm$^2$/s, density at 15° C.: 0.9008 g/cm$^3$), and naphthenic mineral oil (kinematic viscosity at 100° C.: 6.5 mm$^2$/s, kinematic viscosity at 40° C.: 68.3 mm$^2$/s, density at 15° C.: 0.9292 g/cm$^3$) at a mass ratio of 45:45:10.
(b) Urea-urethane thickener: a urea-urethane compound produced by the reaction of diphenylmethane-4-4'-diisocyanate, and cyclohexylamine and octadecyl alcohol.
(c) Triglyceride: pork fat
(d) Diester: dioctyl adipate (a diester of adipic acid and 2-ethylhexanol).
(e) Molybdenum dithiocarbamate (MoDTC): a molybdenum dithiocarbamate represented by the general formula (3), wherein the content of the molybdenum element is 29 mass % and the content of the sulfur element is 28 mass % based on the total amount of molybdenum dithiocarbamate.
(f) Zinc dithiophosphate (ZnDTP): a zinc dithiophosphate, wherein $R^6$ to $R^9$ in the general formula (5) are a C3-8 alkyl group having a secondary structure, and the content of the zinc element is 10 mass %, the content of the phosphorus element is 9 mass %, and content of the sulfur element is 18 mass % based on the total amount of zinc dithiophosphate.
(g) Polysulfide: a polysulfide represented by the general formula (6), wherein the content of the sulfur element is 42 mass % based on polysulfide.
(h) Boron nitride: hexagonal boron nitride powder having an average particle diameter of 2 μm.

(i) An amine antioxidant and an anticorrosive agent (metal sulfonate).

In Examples 1 to 6 and Comparative Example 1, diphenylmethane-4,4'-diisocyanate, and cyclohexylamine and octadecyl alcohol were allowed to react in a lubricating base oil. The produced urea-urethane compound was uniformly dispersed, and then further combined with other components, and the obtained mixture was kneaded by a roll mill to prepare a grease.

The properties (consistency) and characteristics of grease compositions in Examples and Comparative Example were evaluated as follows. The results each are shown in Table 1.

[Consistency]

The consistency at 60 W was measured in accordance with MS K2220.

[Low Temperature Torque]

A grease was sealed in bearing 6204 C3 and rotary torque was measured on the conditions of −30° C. in accordance with HS K2220. A torque in initial rotation of 300 mNm or less was evaluated as "A," a torque of above 300 mNm and 400 mNm or less as "B" and a torque of above 400 mNm as "C." After that, the same results were obtained also in a test using a constant velocity joint in which the grease is sealed.

[Friction Test]

A friction coefficient was measured on the conditions of 100 N, 30 Hz, ±1 mm, 30 minutes and ball/plate in accordance with ASTM D5707. A friction coefficient of 0.08 or less was evaluated as "A," a friction coefficient of above 0.08 and 0.09 or less as "B" and a friction coefficient of above 0.09 as "C." After that, also in the friction test, the same results were obtained in a test using a constant velocity joint in which the grease is sealed.

TABLE 1

| | | Example | | | | | | Comparative Example |
|---|---|---|---|---|---|---|---|---|
| | | 1 | 2 | 3 | 4 | 5 | 6 | 1 |
| Constitution | (a) Lubricating base oil | 85.0 | 86.0 | 88.0 | 84.0 | 86.4 | 86.5 | 86.4 |
| (mass %, based | (b) Urea-urethane thickener | 7.5 | 7.5 | 7.5 | 7.5 | 7.5 | 7.5 | 8.5 |
| on total | (c) Triglyceride | 2.0 | 1.0 | 0.5 | 2.5 | 0.6 | 1.5 | 2.0 |
| amount of | (d) Diester | 2.0 | 2.0 | 0.5 | 2.5 | 2.0 | 1.0 | 0 |
| grease | (e) MoDTC | 1.2 | 1.2 | 1.2 | 1.2 | 1.2 | 1.2 | 0.7 |
| composition) | (in terms of Mo element) | (0.2) | (0.2) | (0.2) | (0.2) | (0.2) | (0.2) | (0.2) |
| | (f) ZnDTP | 0.6 | 0.6 | 0.6 | 0.6 | 0.6 | 0.6 | 0.7 |
| | (g) Polysulfide | 1.2 | 1.2 | 1.2 | 1.2 | 1.2 | 1.2 | 0.6 |
| | (h) Boron nitride | 0.2 | 0.2 | 0.2 | 0.2 | 0.2 | 0.2 | 0 |
| | (i) Other additives | 0.3 | 0.3 | 0.3 | 0.3 | 0.3 | 0.3 | 1.1 |
| Mass ratio: (c)/(d) | | 1.0 | 0.5 | 1.0 | 1.0 | 0.3 | 1.5 | — |
| Property | Consistency | 330 | 330 | 330 | 330 | 330 | 330 | 330 |
| Characteristics | Low temperature torque | B | A | B | B | A | B | C |
| | Friction test | A | A | A | A | A | A | A |

Examples 1 to 6 are grease compositions obtained by using (c) a triglyceride and (d) a diester in combination, and are excellent in respect of both low temperature torque and friction characteristics. That is, they are grease compositions which can improve durability under severe lubrication conditions.

Comparative Example 1, contrarily, is a grease composition, to which (d) a diester is removed, and is a grease composition which has poor durability under severe lubrication conditions.

INDUSTRIAL APPLICABILITY

The grease composition of the present invention can improve durability under severe lubrication conditions in a constant velocity joint.

REFERENCE SIGNS LIST

10: Birfield-type fixed constant velocity joint, 11: external joint member, 11a: inner peripheral surface, 11b: groove, 12: internal joint member, 12a: outer peripheral surface, 12b: groove, 13: ball, 14: cage, 20: undercut free-type fixed constant velocity joint, 60: drive shaft for an automobile, 61: shaft, and 62, 63: boot.

The invention claimed is:

1. A grease composition for constant velocity joints comprising:
   a lubricating base oil;
   a thickener comprising a nitrogen-containing compound;
   a triglyceride;
   dioctyl adipate; and
   a boron nitride,
   wherein a total content of the triglyceride and the dioctyl adipate is 1 to 5 mass % based on a total amount of the grease composition, and a mass ratio of a content of the triglyceride to a content of the dioctyl adipate (triglyceride/dioctyl adipate) is 0.3 to 1.5 wherein a content of the boron nitride is 0.05 to 1 mass % based on the total amount of the grease composition.

2. The grease composition for constant velocity joints according to claim 1, further comprising an organomolybdenum, a zinc dithiophosphate and a polysulfide.

3. The grease composition for constant velocity joints according to claim 2, wherein,
   a content of the organomolybdenum is 0.05 to 0.5 mass % in terms of molybdenum element, and
   a total content of the organomolybdenum, the zinc dithiophosphate and the polysulfide is 2 to 5 mass %, based on the total amount of the grease composition.

4. The grease composition for constant velocity joints according to claim 1, wherein the composition is used for lubricating constant velocity joints applied to drive shafts for automobiles.

5. A constant velocity joint comprising, the grease composition for constant velocity joints according to claim 1, the grease composition sealed in the constant velocity joint.

* * * * *